United States Patent [19]

Yanagawa et al.

[11] Patent Number: 5,590,007
[45] Date of Patent: Dec. 31, 1996

[54] MAGNETIC HEAD DRIVING APPARATUS HAVING A MAGNETIC HEAD WHICH IS IMMUNE TO THE INFLUENCE OF A MAGNETIC CIRCUIT

[75] Inventors: Yoshifumi Yanagawa, Kyoto; Tadashi Kunihira, Osaka, both of Japan

[73] Assignee: Matsushita Electric Industrial Co., Ltd., Osaka-fu, Japan

[21] Appl. No.: 375,514

[22] Filed: Jan. 18, 1995

Related U.S. Application Data

[63] Continuation of Ser. No. 62,610, May 18, 1993, abandoned.

[30] Foreign Application Priority Data

Jun. 29, 1992 [JP] Japan ................................. 4-170410

[51] Int. Cl.6 .................................................. G11B 5/588
[52] U.S. Cl. ............................................... 360/109; 360/84
[58] Field of Search ..................................... 360/109, 104, 360/77.13, 77.14, 77.15, 77.16, 77.17, 84, 130.24, 107

[56] References Cited

U.S. PATENT DOCUMENTS

| | | | |
|---|---|---|---|
| 4,641,214 | 2/1987 | Imanishi et al. | 360/130.24 |
| 4,695,907 | 9/1987 | Inaji et al. | 360/77.13 |
| 4,882,635 | 11/1989 | Sanai | 360/109 |
| 4,987,505 | 1/1991 | Iwabuchi et al. | 360/103 |
| 5,223,992 | 6/1993 | Mitsuhashi | 360/77.16 |
| 5,341,256 | 8/1994 | Murata et al. | 360/109 |

FOREIGN PATENT DOCUMENTS 63-173217  7/1988  Japan.

*Primary Examiner*—Robert S. Tupper
*Assistant Examiner*—William R. Korzuch
*Attorney, Agent, or Firm*—Wenderoth, Lind & Ponack

[57] ABSTRACT

A magnetic head driving apparatus makes it possible to effect a correct positioning operation at the assembly of the magnetic head, and also, to effect the correct measurement of the gap positions of the magnetic head. Also, the magnetic head is immune to the influence of the leakage flux of the magnetic circuit. Coil bobbins are mounted in a first gimbal spring and a second gimbal spring and the head has a projection in its lower end portion. The projection portion is extended through the hole of the first yoke. The head base is secured with a fixing member in the projection portion. A head base extending portion extending in a radial direction is formed in one portion of the external periphery of the head base with a magnetic head being mounted on its tip end. A sensor object showing the gap position of the magnetic head is formed in one portion of the head base extending portion.

7 Claims, 3 Drawing Sheets

5,590,007

MAGNETIC HEAD DRIVING APPARATUS HAVING A MAGNETIC HEAD WHICH IS IMMUNE TO THE INFLUENCE OF A MAGNETIC CIRCUIT

This application is a Continuation of now abandoned application Ser. No. 08/062,610, filed May 18, 1993, now abandoned.

BACKGROUND OF THE INVENTION

The present invention generally relates to a rotary head of a magnetic recording and reproducing apparatus, and more particularly, to a magnetic recording and reproducing apparatus for effecting recording and reproducing with a magnetic head which is movable in the width direction of a magnetic tape.

In recent years, a method of correctly tracing on the recording track by a magnetic head so as to obtain noiseless reproduced pictures has been proposed and carried out by controlling the magnetic head using a magnetic head driving apparatus mounted on a rotary cylinder during the special reproducing time of slow motion reproduction, fast forward reproduction and so on in the magnetic recording and reproducing apparatus. It is necessary to correctly detect the position of the magnetic head so as to effect a recording operation usingthe magnetic head.

A magnetic head driving apparatus (FIG. 5) used conventionally in a rotary head of a magnetic recording and reproducing apparatus is shown. FIG. 5 is a sectional view of the conventional magnetic head driving apparatus shown, for example in Japanese Laid-Open Patent Application Tokukaisho No. 63-173217. In FIG. 5, reference numeral 1 denotes a magnetic head, and reference numeral 2 denotes a coil portion. The coil portion 2 is composed of a cylindrically shaped coil bobbin 2a and a coil 2b wound around it. A hollow cylindrically shaped outer peripheral second yoke 5 has a larger inside diameter than the coil bobbin 2a, and is made of a material which has a high permeability. Both an outer peripheral first yoke 6a, and an outer peripheral third yoke 6b are made of material which has a high permeability and are secured to both the ends of the cylindrically shaped outer peripheral second yoke 5. The outside diameter portion of a first gimbal spring 3a having a spring extending portion 10 with a magnetic head 1 being mounted on it is mounted on the first yoke 6a or the second yoke 5. The outside diameter of a second gimbal spring 3b is mounted on the second yoke 5 or the third yoke 6b. The inner edge portion of a first gimbal spring 3a is secured on the coil bobbin 2a by a first mounting member 4a. The inner edge portion of a second gimbal spring 3b is secured on the coil bobbin 2a by a second mounting member 4b. A cylindrically shaped first permanent magnet 7a and a cylindrically shaped second permanent magnet 7b are arranged adjacent to both the ends of the cylindrically shaped magnetic core 8, and are arranged coaxially within the cylindrically shaped second yoke 5.

When an electric current flows through the coil 2b, an electromagnetic force in the axial direction is caused in the coil 2b by Fleming's left-hand rule. The coil bobbin 2a moves in the axial direction, because the upper and lower end portions are respectively supported by the first gimbal spring 3a and the second gimbal spring 3b. The magnetic head 1 is also moved in the axial direction through the first gimbal spring 3a secured onto the coil bobbin 2a.

In such a conventional magnetic recording and reproducing apparatus as described hereinabove, there is a problem in that a flapping angle, an azimuth angle of the magnetic head 1 cannot be ensured, and the recording operation cannot be correctly effected in accordance with the format, because the positional accuracy of the magnetic head 1 depends upon the assembling accuracy of the magnetic head driving apparatus and the magnetic head 1 cannot be correctly positioned as the magnetic head 1 is mounted upon the extending portion 10 of the first gimbal spring 3a.

There is a problem in that the leakage flux of the magnetic circuit can apply ill influences upon the magnetic head 1, because the magnetic head 1 is disposed in extreme proximity to the magnetic circuit.

The position of the magnetic head 1 is difficult to correctly detect in the recording operation using the magnetic head 1 of the magnetic head driving apparatus, with a problem in that the recording operation cannot be effected correctly in accordance with the format.

SUMMARY OF THE INVENTION

Accordingly, the present invention has been developed with a view to substantially eliminate the above discussed drawbacks inherent in the prior art, and has for its essential object to provide an improved magnetic head driving apparatus.

Another important object of the present invention is to provide an improved magnetic head driving apparatus comprising a means for making it possible to effect the correct positioning of the magnetic head, a means for making the magnetic head immune to the influences of the magnetic circuit, and a means for making it possible to effect the correct detecting of the position of the magnetic head.

In accomplishing these and other objects, according to one preferred embodiment of the present invention, there is provided a magnetic head driving apparatus which includes a first yoke composed of a magnetic material, a cylindrical first permanent magnet secured to the first yoke, a second yoke composed of an empty cylindrical magnetic material which is opposite to the side face of the first permanent magnet and mounted on the first yoke, a third yoke composed of a magnetic material mounted on the second yoke, a second permanent magnet secured to the above described third yoke, a magnetic core composed of a magnetic material disposed between the first permanent magnet and the second permanent magnet, a first gimbal spring mounted on the first yoke or the second yoke, a second gimbal spring mounted on the second yoke or the about described third yoke, a coil bobbin mounted on the first gimbal spring and the second gimbal spring, a coil wound around the coil bobbin; a hole is provided in the first yoke, a projecting portion extending through the hole is provided in the above described coil bobbin, and a head base is mounted on the projection portion so as to position the magnetic head mounted on the head base on the external side of the above described first yoke.

In the present invention, one portion of a head base mounted on the projection portion of the coil bobbin forms a sensor object showing the gap position of the magnetic head.

A sensor object showing the gap position of the magnetic head is secured onto the head base mounted on the projection portion of the coil bobbin.

A plurality of magnetic heads mounted onto the head base and a plurality of sensor objects showing the respective gap positions of the magnetic heads are provided.

The parallel degree of the opposite face of a first yoke and the head base is retained by the above described construction so as to mount the head base on the coil bobbin so that a flapping angle and an azimuth angle of the magnetic head can be ensured. As the magnetic head is disposed on the outer side of a first yoke, a second yoke, and a third yoke for constituting the magnetic circuit, the magnetic head is immune to the influences of the leakage magnetic flux of the magnetic circuit.

The gap position of the magnetic head can be correctly detected using one portion of the head base as a sensor object.

The sensor object can be formed without dependence upon the shape of the head base by the adherence of the sensor object upon the head base. The sensor object can correctly show the gap position of the magnetic head. Therefore, the gap position of the magnetic head can be correctly detected.

The gap positions of the respective magnetic heads can be correctly detected even in a magnetic head driving apparatus having a plurality of magnetic heads by mounting a plurality of magnetic heads upon the head base and providing a plurality of sensor objects showing the gap positions of the respective magnetic heads.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
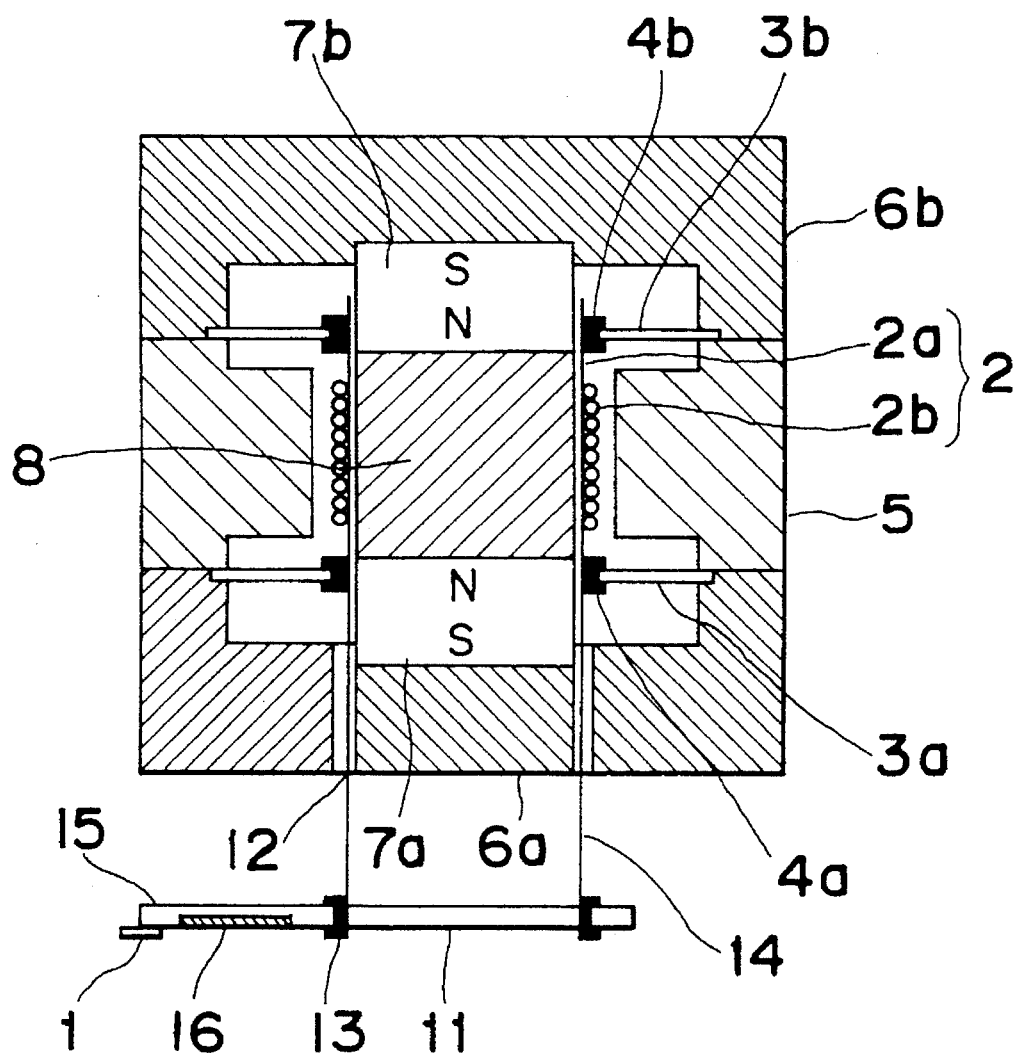
FIG. 1 is a sectional view of a magnetic head driving apparatus in accordance with a first embodiment of the present invention.

Before the description of the present invention proceeds, it is to be noted that like parts are designated by like reference numerals throughout the drawing figures.

A magnetic head driving apparatus in accordance with a first embodiment of the present invention will be described hereinafter with reference to the drawings.

FIG. 1 is a central sectional view of a magnetic head driving apparatus in accordance with the first embodiment of the present invention.

A first gimbal spring 3a is the same in shape as a second gimbal spring 3b as shown in FIG. 1. The first gimbal spring 3a is secured onto a first yoke 6a with four holes 12 being provided in it or a second yoke 5. The coil bobbin 2a is mounted on the first gimbal spring 3a and the second gimbal spring 3b, and has four projection portions 14 downwards extended on the drawings. The projection portions 14 extend through a hole 12 of the first yoke 6a. A head base 11 is secured to each of the projection portions 14 with a securing member 13. A head base extending portion 15 extending in a radial direction is provided in one portion of the outer periphery of the head base 11, and the magnetic head 1 is mounted on the head base extending portion 15. A sensor object 16 showing the gap position of the magnetic head 1 is formed on one portion of the head base extending portion 15.

A magnetic head 1 is disposed on the outer sides of a first yoke 6a, a second yoke 5, and a third yoke 6b for constituting a magnetic circuit in this manner so that the magnetic head 1 is immune to the influences of the leakage magnetic flux of the magnetic circuit.

In FIG. 1, the top face of the head base 11 and the bottom face of the first yoke 6a respectively have sufficient face accuracy. A head base mounting jig is inserted between the top face of the head base 11 and the bottom face of the first yoke 6a when the magnetic head driving apparatus is assembled. The head base mounting jig has sufficient parallel degree between the top face (face which comes into contact with the bottom face of the first yoke 6a) and the bottom face (face which comes into contact with the top face of the head base 11), and sufficient face accuracy on the respective 10 faces, and further, small projections for positioning the head base 11 in the right, left direction and a direction vertical to a paper face in FIG. 1. Holes which are larger in diameter than the tip end shape of the projection portions 14 are provided in position equivalent to the projection portion 14 in the head base 11, with the projection portions 14 being adapted not to come into contact with the hole. The head base mounting jig is inserted, the head base 11 is positioned with the small projection on the above described mounting jig, and is depressed in an upper direction in FIG. 1, a fixing member 13 is flowed into the above described hole of the head base 11 so as to secure the head base 11 onto the coil bobbin 2a so that the position of the magnetic head 1 can be correctly positioned. The mounting reference face (the top face of the first yoke 6a in the present embodiment) of the magnetic head driving apparatus and the height accuracy of the head base 11 can be controlled to thereby retain the height accuracy of the magnetic head 1, and also, the angular aberration of the azimuth angle direction and the flapping angle direction of the magnetic head 1 caused during the assembly can be controlled. In addition, it is possible to fixedly mount the head base 11 on the coil bobbin 2 upon compensating for the difference with a standard value after measuring the flapping angle and the azimuth angle of the magnetic head.

Figure 2:
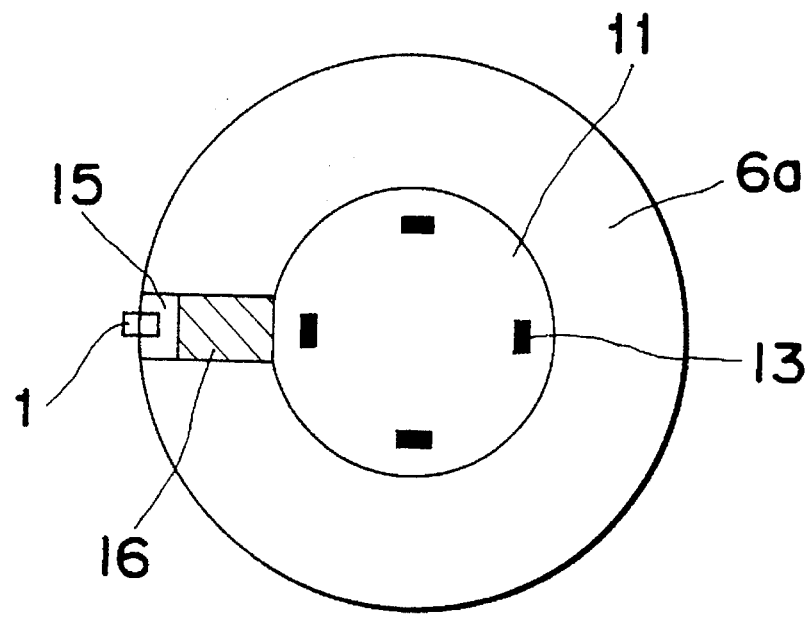
FIG. 2 is a bottom face view of a magnetic head driving apparatus in accordance with the first embodiment of the present invention.

FIG. 2 is a bottom face view of a magnetic head driving apparatus in accordance with the first embodiment of the present invention.

The sensor object 16 is subjected to a cutting process on the lower face thereof, and the concave or convex amount of the sensor object 16 against the lower face of the head base 11 is varied so that the interval between the gap lower end of the magnetic head 1 and the lower face of the sensor objects 16 becomes normally constant. Therefore, the individual difference of the gap lower end position of the magnetic head 1 are absorbed by the concave or convex amount of the sensor object 16.

In the present embodiment, an electric current flows through the coil 2b so as to cause a force for displacing the coil bobbin 2 in the axial direction so as to thereby displace the magnetic head 1 mounted on the head base 11. The displacement of the magnetic head 1 becomes the displacement of the sensor object 16. The position of the magnetic head 1 at this time point can be measured by the measurement of the sensor object 16 from the lower cylinder using the optical type displacement sensor (not shown) secured to the lower cylinder upper portion.

Figure 3:
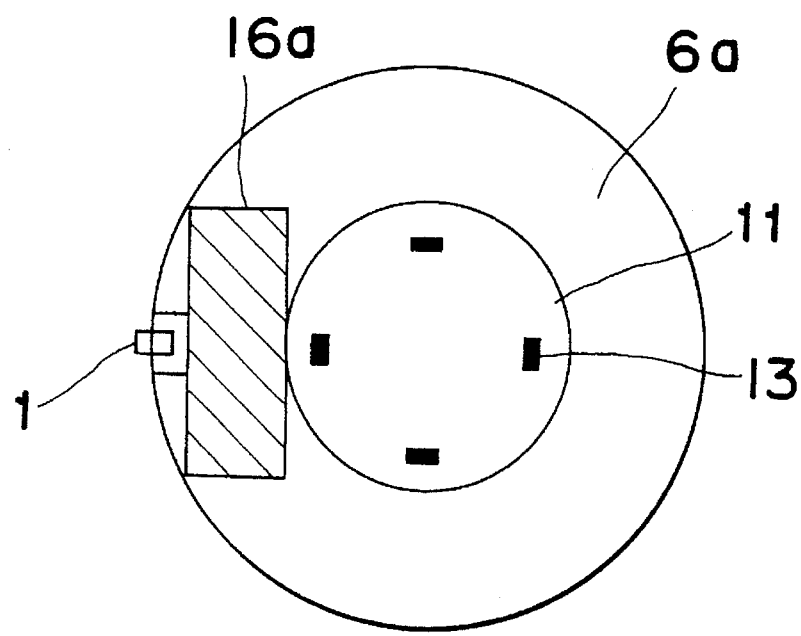
FIG. 3 is a bottom face view of a magnetic head driving apparatus in accordance with a second embodiment of the present invention.

FIG. 3 is a bottom face view of a magnetic head driving apparatus in accordance with a second embodiment of the present invention. The sensor object 16a is a member different from a head base 11 and is secured to the head base 11. The sensor object 16a can be easily worked as the gap position of the magnetic head 1 is shown correctly by the measurement of the sensor object 16a of the rotating head driving apparatus with a displacement detection sensor (not shown) secured to the lower cylinder provided under the present driving apparatus. In order to increase the design freedom degree in the shape of the sensor object 16a, the sensor object 16a can be designed so as to make it possible to measure it even with the sensor which is low in response frequency such as eddy-current sensor or the like.

Figure 4:
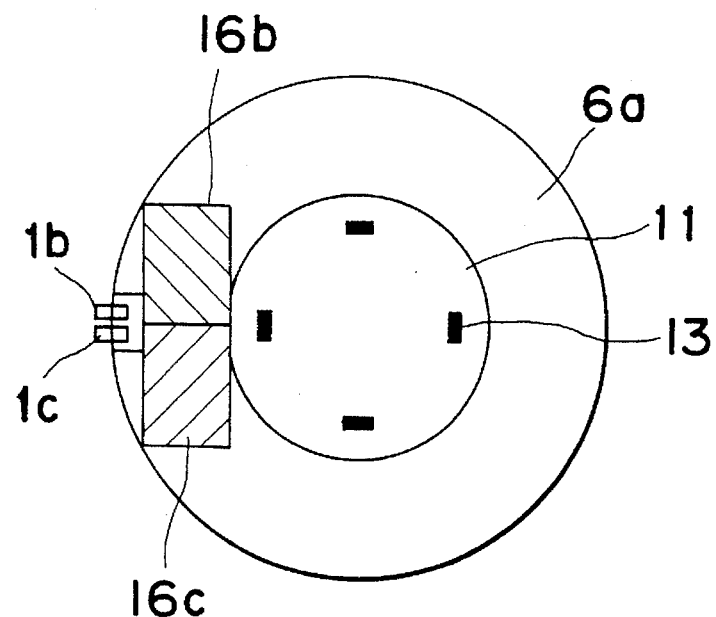
FIG. 4 is a bottom face view of a magnetic head driving apparatus in accordance with a third embodiment of the present invention.
Figure 5:
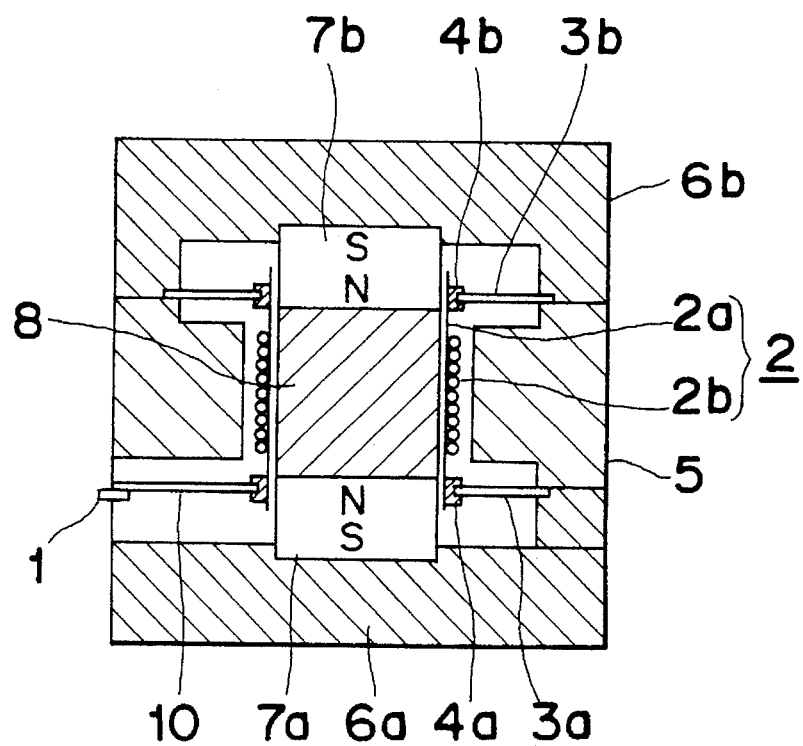
FIG. 5 is a sectional view of the conventional magnetic head driving apparatus.

FIG. 4 is a bottom face view of a magnetic head driving apparatus in accordance with a third embodiment of the present invention. In the embodiment, two sensor objects, 16b and 16c are used and the sensor object 16b shows the gap position of the magnetic head 1b, and the sensor object 16c shows the gap position of the magnetic head 1c. The gap positions of the magnetic heads 1b and 1c can be correctly detected by the measurement of the sensor objects 16b and 16c of the rotating magnetic head driving apparatus with a displacement detecting sensor (not shown) disposed on the lower cylinder provided under the present driving apparatus.

In the present embodiment, an electric current flows through a coil as in the first embodiment so as to cause force for displacing in an axial direction the coil bobbin 2a so as to displace the magnetic heads 1b and 1c mounted on the head base 11. The displacement of the magnetic heads 1b and 1c become the displacement of the sensor objects 16 and 16c. The positions of the magnetic head 1b and 1c at this time point can be measured by the measurement of the sensor objects 16b and 16c from the lower cylinder using the displacement detection sensor (not shown) disposed on the lower cylinder upper portion. The mounting errors in the securing operation of the magnetic head 1b and the magnetic head 1c to the head base 11, and the distance dispersion from the head gap of the magnetic heads 1b and 1c to the mounting face of the head base 11 can be absorbed by the sensor objects 16b and 16c.

The present invention is capable of various modifications in accordance with the summary of the present invention without any limit in the above described embodiment, and does not exclude them from the present invention.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A magnetic head driving apparatus which comprises:
   a first yoke having a plurality of apertures therein and composed of a magnetic material;
   a cylindrical first permanent magnet secured to said first yoke;
   a second yoke composed of empty cylindrical magnetic material which is opposite to a side face of said first permanent magnet and which is mounted on said first yoke;
   a third yoke composed of a magnetic material mounted on said second yoke;
   a second permanent magnet secured to said third yoke; a magnetic core composed of a magnetic material disposed between said first permanent magnet and said second permanent magnet; a first gimbal spring mounted on said first yoke or said second yoke; a second gimbal spring mounted on said second yoke or said third yoke; a coil bobbin mounted on said first gimbal spring and said second gimbal spring; a coil wound around said coil bobbin; a plurality of rigid projecting portions of said coil bobbin extending through said plurality of apertures of said first yoke;
   a head base mounted on and supported by said extended rigid projecting portions of said coil bobbin so as to position a magnetic head mounted on said head base on an external side of said first yoke, each of said plurality of rigid projecting portions being integrally formed with the coil bobbin; and
   a sensor object for showing the gap position provided on said head base;
   wherein said head base undergoes no deformation angle when said magnetic head is displaced.

2. A magnetic head driving apparatus as defined in claim 1, wherein one portion of said head base mounted on said plurality of projecting portions forms said sensor object for showing a gap position of said magnetic head.

3. A magnetic head driving apparatus as defined in claim 2, further comprising a plurality of magnetic heads mounted on said head base, and a plurality of sensor objects showing the respective gap positions of said plurality of magnetic heads.

4. A magnetic head driving apparatus as defined in claim 1, wherein said sensor object is for showing a gap position of said magnetic head, said sensor object being secured on said head base mounted on said plurality of projecting portions.

5. A magnetic head driving apparatus as defined in claim 4, further comprising a plurality of magnetic heads mounted on said the head base, and a plurality of sensor objects showing the respective gap positions of said plurality of magnetic heads.

6. The magnetic head driving apparatus of claim 1, wherein said plurality of apertures extend in directions parallel to the axis of said coil bobbin through said first yoke.

7. The magnetic head driving apparatus of claim 6, wherein said plurality of rigid projecting portions extend through said plurality of apertures in said directions so as to position said head base parallel to a bottom face of said first yoke.

* * * * *